UNITED STATES PATENT OFFICE.

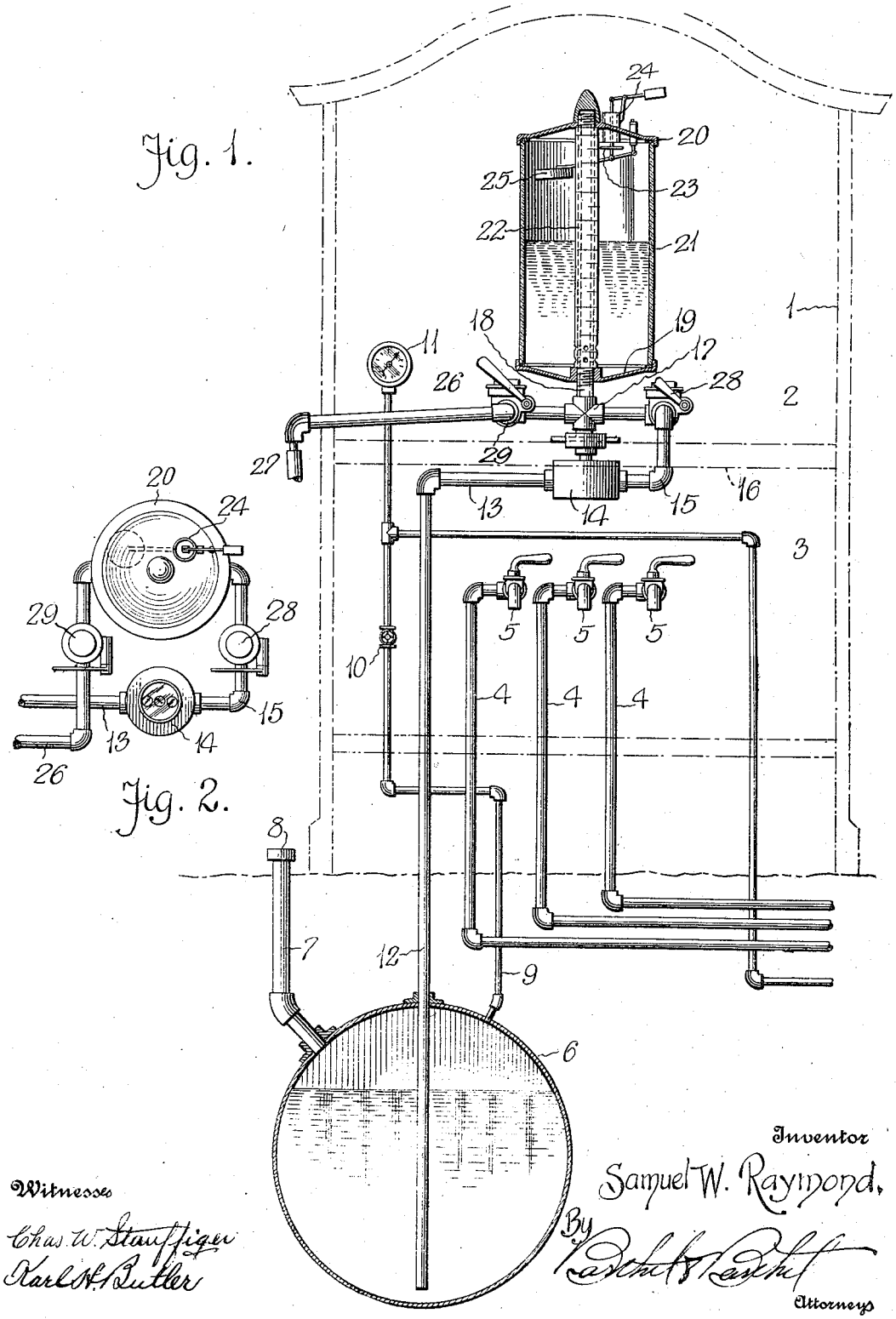

SAMUEL W. RAYMOND, OF ADRIAN, MICHIGAN.

SERVICE-STATION EQUIPMENT.

1,204,487. Specification of Letters Patent. Patented Nov. 14, 1916.

Application filed February 14, 1916. Serial No. 78,151.

*To all whom it may concern:*

Be it known that I, SAMUEL W. RAYMOND, a citizen of the United States of America, residing at Adrian, in the county of Lenawee and State of Michigan, have invented certain new and useful Improvements in Service-Station Equipments, of which the following is a specification, reference being had therein to the accompanying drawings.

This invention relates to an automobile service station equipment, especially designed for a service station.

The primary object of my invention is to furnish a service station with a novel auxiliary fuel reservoir which permits of a customer to readily observe the quantity and quality of the fuel dispensed by the station.

A further object of my invention is to provide a simple, durable and inexpensive gasolene dispensing apparatus that can be safely and conveniently housed at any place to conveniently serve the chauffeurs and owners of automobiles or other motor propelled vehicles, the apparatus allowing the chauffeur or owner to obtain a predetermined quantity of gasolene and observe the condition of the same prior to placing the fuel in the fuel reservoir of the vehicle.

With the above and other objects in view my invention resides in the novel construction, combination and arrangement of parts to be hereinafter specifically described and then claimed, and reference will now be had to the drawing, wherein—

Figure 1 is an elevation of the automobile service station equipment, partially broken away and partly in section, and Fig. 2 is a plan of an auxiliary fuel reservoir forming part of the invention.

In the drawing, 1 denotes a station, housing or inclosure having compartments 2 and 3, and extending into the compartment 3 are supply pipes or conduits 4 provided with faucets 5, said faucets allowing various grades of fuel or lubricants to be obtained from suitable supply reservoirs (not shown).

Below the station and embedded in the ground for safety purposes is a main gasolene tank 6 having a filling connection 7 normally closed by a cap 8. This reservoir is adapted to contain fuel under air pressure, and air is supplied to the reservoir by air connections 9 having a valve 10 and a gage 11, said connection extending to a suitable pump or air supply (not shown). The valve 10 is located within the compartment 3 of the station and the gage 11 within the compartment 2 of the station. The valve 10 permits of air pressure being regulated upon the gasolene within the reservoir 6, and the gage 11 permits of the air pressure from the main supply being observed.

Extending into the reservoir 6 and in proximity to the bottom thereof is an upright pipe 12 which extends into the compartment 3 of the station 1. The upper end of the pipe 12 has a lateral branch 13 supporting a conventional form of meter 14. The meter 14 has connections 15 extending through the dividing walls 16 of the compartments 2 and 3 of the station and said connections are in communication with a four-way connection 17 mounted on the wall 16. The connection 17 has one of the openings thereof plugged or closed by a flanged base or foot for an auxiliary gasolene reservoir within the compartment 2 of the station, said connection, by reason of one of its openings being closed, serving as a three-way connection. This auxiliary reservoir comprises an upright perforated pipe having a base 19, a cap 20, and an interposed transparent cylinder 21; the base 19 and the cap 20 have nonleakable connections with the ends of the cylinder 21. Surrounding the pipe 18 within the cylinder 21 is a graduated tube 22 perforated at its lower end to admit fuel to the cylinder 21 and with said tube graduated the quantity of fuel within said auxiliary reservoir is easily determined.

The cap 20 of the auxiliary reservoir has an atmospheric valve 23 which can be manually closed through the medium of a lever 24, and automatically close through the medium of a float lever 25, the former being above the cap 20 and the latter within the cylinder 21 whereby the fuel within the cylinder, when reaching a predetermined level will close the atmospheric valve and prevent further flow of fuel into the cylinder.

The four-way connection 17 has outlet connections 26 extending through the side wall of the station 1 and provided with a flexible hose or other conduits 27 which permits of the fuel reservoir of a vehicle being filled.

The connections 15 and 26 are provided with two-way valves 28 and 29 respectively and by opening and closing said valves a quantity of fuel may be admitted to the auxiliary reservoir and then allowed to flow from said auxiliary reservoir to a vehicle reservoir.

A purchaser of gasolene or other liquid fuel may open the valve 28 to allow a quantity of fuel to flow into the auxiliary transparent reservoir and after a desired quantity of fuel has entered this auxiliary reservoir, the valve 28 may be closed and the valve 29 opened thus allowing fuel within the auxiliary reservoir to flow to the reservoir of a vehicle. With the fuel within the transparent auxiliary reservoir it is possible for the purchaser to observe the quality of the same and the purchaser is furthermore assured of obtaining a desired and accurate measure of fuel.

What I claim is:—

In an automobile service station equipment, a connection, a transparent auxiliary reservoir supported by said connection and communicating therewith, an atmospheric valve on said auxiliary reservoir, inlet and outlet connections for said connection, valves forming part of said inlet and outlet connections, and means throughout the length of said auxiliary reservoir adapted to indicate the quantity of the contents thereof.

In testimony whereof I affix my signature in presence of two witnesses.

SAMUEL W. RAYMOND.

Witnesses:
 ANNA M. DORR,
 KARL H. BUTLER.